(12) United States Patent
Waterson et al.

(10) Patent No.: US 11,868,464 B2
(45) Date of Patent: Jan. 9, 2024

(54) LAUNCHING APPLICATIONS

(71) Applicant: SentryBay Limited, London (GB)

(72) Inventors: David Lynch Waterson, London (GB);
Rynier Van Der Watt, London (GB)

(73) Assignee: SentryBay Limited, London (GB)

( * ) Notice: Subject to any disclaimer, the term of this patent is extended or adjusted under 35 U.S.C. 154(b) by 127 days.

(21) Appl. No.: 17/559,308

(22) Filed: Dec. 22, 2021

(65) Prior Publication Data
US 2022/0197992 A1    Jun. 23, 2022

Related U.S. Application Data

(60) Provisional application No. 63/129,065, filed on Dec. 22, 2020.

(51) Int. Cl.
| | |
|---|---|
| G06F 21/00 | (2013.01) |
| G06F 21/51 | (2013.01) |
| G06F 21/57 | (2013.01) |
| G06F 21/53 | (2013.01) |
| G06F 21/56 | (2013.01) |

(52) U.S. Cl.
CPC ............. G06F 21/51 (2013.01); G06F 21/53 (2013.01); G06F 21/56 (2013.01); G06F 21/57 (2013.01)

(58) Field of Classification Search
CPC .......... G06F 21/51; G06F 21/53; G06F 21/56; G06F 21/57; G06F 21/64
See application file for complete search history.

(56) References Cited

U.S. PATENT DOCUMENTS

| | | | | |
|---|---|---|---|---|
| 2007/0245409 A1* | 10/2007 | Harris | ...................... | H04L 67/06 726/5 |
| 2010/0024036 A1* | 1/2010 | Morozov | ................ | G06F 21/53 726/26 |
| 2020/0184074 A1* | 6/2020 | Soman | .................. | G06F 21/604 |

* cited by examiner

Primary Examiner — Ghazal B Shehni
(74) Attorney, Agent, or Firm — Studebaker & Brackett PC

(57) ABSTRACT

A method and/or system for processing an application for launch to determine whether it might be legitimate or non-legitimate, and if non-legitimate taking security action.

19 Claims, 5 Drawing Sheets

LAUNCHING APPLICATIONS

FIELD OF THE INVENTION

The present invention relates to a method and/or system for processing an application for launch to determine whether it might be legitimate or non-legitimate, and if non-legitimate taking security action.

BACKGROUND

On Windows™ operating systems today, there is no validation of processes at execution time. At best, anti-virus solutions may prevent an initial process from starting until the file (Hash) has been validated against a known bad database if it meets certain criteria. But this is relatively easy for an attacker to overcome this by using a unique executable that has never been seen elsewhere.

It is relatively easy for an attacker/malware to overwrite parts installed application code with malicious versions (often reverse engineered DLLs with malicious code appended. These then appear to work in the normal whilst executing malicious code potentially exploiting the confidentiality of the application/s as well as well as the wider system.

SUMMARY OF INVENTION

It is an object of the present invention to prevent launch and/or take other security action when a user attempts to launch a non-legitimate application.

Terminology

Windows™ OS—for example, Windows™ 7SP1, Windows™ 8.1 and Windows™ 10 or any other Windows™ Operating system.

Application, Process—Executable binary running on Windows OS (or other operating system as appropriate. The term "application" can be used interchangeably with "process" or as a generic term. The terms can also be used interchangeably with the term "executable".

Windows Service—Windows application run by the OS in the local system context.

Protected Environment—Process running in a different User context being monitored and protected by process validation checks.

Protected Application—A third party application being protected in the protected environment running locally on the Windows OS.

In one aspect the present invention may be said to comprise a method for executing a process on a Windows™ operating system comprising: monitoring processes in a protected environment, detecting a new process in the protected environment, and checking that the process is legitimate and can be verified by carrying out process validation checks comprising, in any order, determining if the process: is a child process of a previously verified process in the protected environment, and has a valid digital certificate, and executing the process if the validation process checks are satisfied, or taking remedial action if the validation process checks are not satisfied.

Optionally the step of monitoring processes in a protected environment comprises scanning for new processes on the operating system and identifying processes in the protected environment.

Optionally the step of determining if the process is a child process of a previously verified process in the protected environment comprises calling a Windows™ operating system function.

Optionally there is a limit on the number of processes which can be held in a process thread.

Optionally the step of determining if a process has a valid digital certificate comprises running a Windows™ operating system or openssl Crypto API on each of one of more digital certificates in the digital certificate chain.

Optionally the monitoring process and the validation are operated by a utility running in a Windows™ System account and the protected environment is a temporary Windows™ user account.

In another aspect the present invention may be said to comprise a method for executing a plurality of processes on a Windows™ operating system comprising: receiving an instruction to execute a process in a protected environment and, with a utility for managing launch of processes in protected environments: verifying the process by checking the process has a valid digital certificate, creating a protected environment, and launching the process in the protected environment, wherein upon launch of the process in the protected environment the method comprises, with the utility for managing launch of processes in protected environments: detecting one or more further processes in the protected environment, checking that each of the one or more further processes are legitimate and can be verified by carrying out process validation checks comprising, in any order, determining if each of the one or more further processes: is a child process of a previously verified process, and has a valid digital certificate, and, executing each of the one or more further process if the validation process checks are satisfied, or taking remedial action if the validation process checks are not satisfied.

Optionally the step of creating a protected environment comprises the step of creating a temporary user account with a random password.

Optionally the utility operates in the system environment of the Windows™ operating system and/or the instruction to execute the process in the protected environment is received from a user in a Windows™ user account.

Optionally the step of creating the protected environment comprises the step of creating an IPC communication channel with shared memory between the utility and the protected environment.

Optionally the step of detecting one or more further processes in the protected environment, comprises the steps of: checking for processes running on the windows operating system, identifying new processes, and identifying which of the new processes are associated with the protected environment.

In another aspect the present invention may be said to comprise a computer system configured executing a process on a Windows™ operating system comprising: A Windows™ operating system a utility for managing launch of processes, and a processor configured for executing the operating system and utility, wherein upon receiving an instruction to execute a process with the utility the processor is configured to: check the process has a valid digital certificate, create a protected environment, launch the process in the protected environment, and wherein upon launch of the process in the protected environment the processor is configured to: detect further processes in the protected environment, check that the further processes are legitimate and can be verified by carrying out process validation checks comprising, in any order, determining if each of the further processes: is a child process of a previously verified process, and has a valid digital certificate, and, execute the further process if the validation process checks are satisfied, or take remedial action if the validation process checks are not satisfied.

Optionally the utility operates in a Windows' system account, the protected environment is a temporary Windows™ user account and the instruction is received from a further Windows™ user account.

In another aspect the present invention may be said to comprise a method for executing a process on a Windows™ operating system comprising: detecting an attempt to launch the process, and checking that the process is legitimate and can be launched by carrying out process validation checks comprising, in any order, determining if the process: is a child process of a previously verified process, has a valid digital certificate, and launching the process if the validation process checks are satisfied, or taking remedial action if the validation process checks are not satisfied.

Optionally the process validation checks further comprising a preliminary check to determine if the process is starting in a protected environment.

Optionally the process validation checks further comprising a preliminary check to determine if the process is an exception.

Optionally if the process is an exception, then during the process validation checks: if the process is an excluded process, omitting determining if the process has a valid certificate, if the process is a child unrestricted white list process, omitting determining if the process is a child process of a previously verified process, if the process child restricted white list process, omitting determining if the process is a child process of a previously verified process, but prevent the process spawning a child process.

Optionally if the process is a root process, during the process validation checks omitting determining if the process is a child process of a previously verified process.

Optionally the method further comprises creating a process thread to handle a process detected out of sequence with parent and/or child processes.

Optionally remedial action comprises one or more of:
a) preventing launch of/terminating application related to the process,
b) preventing launch of/terminating the process,
c) ignore the process,
d) reporting to a call back or launch function, and/or
e) providing advisory, warnings, errors etc., Optionally the steps are repeated for a subsequent detected process.

In another aspect the present invention may be said to comprise a computer system configured executing a process on a Windows™ operating system comprising: a Windows™ operating system, a utility for managing launch of processes, and processor configured for executing the operating system and utility, wherein upon executing of the utility the processor is configured to: detect an attempt to launch the process, and check that the process is legitimate and can be launched by carrying out process validation checks comprising, in any order, determining if the process: is a child process of a previously verified process, has a valid digital certificate, and launch the process if the validation process checks are satisfied, or take remedial action if the validation process checks are not satisfied.

Optionally the utility comprises: a service an attempt to detect launch of a process, an application launcher, a verification process module to carry out the process validation checks.

Optionally the utility creates a protected environment.

The term "comprising" as used in this specification means "consisting at least in part of". Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF DRAWINGS

Embodiment will be described with reference to the following drawings of which.

DETAILED DESCRIPTION

Overview of Embodiments

Figure 1:
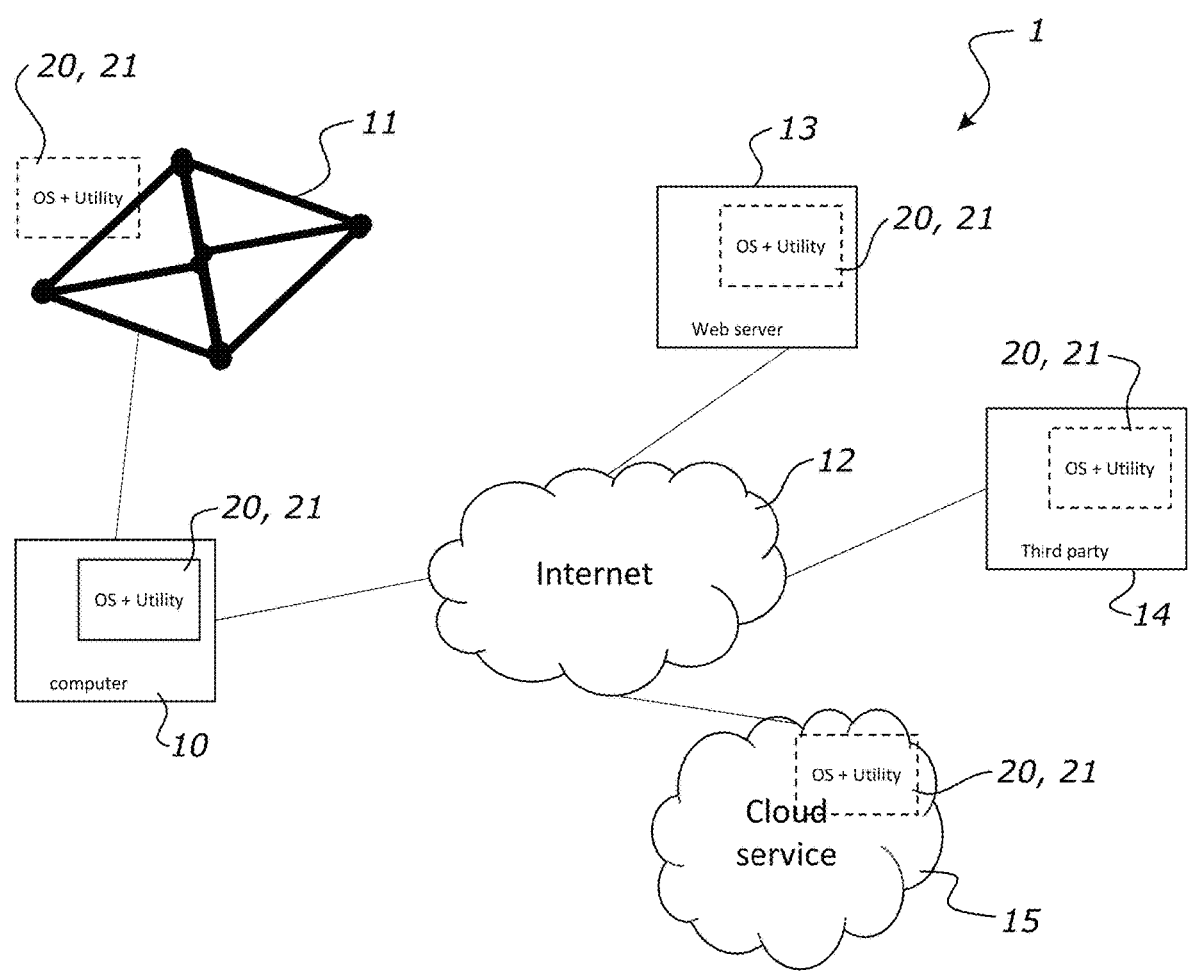
FIG. 1 shows a system that implements a protection utility for conducts a verification process to determine if an application is legitimate or no-legitimate, and take security action if it is deemed non-legitimate.

In general terms, the present embodiments provide a method and/or system that detects execution or attempted launch of an application, attempts to verify the applications and/or processes of the application through a range of checks (verification procedure), and if they do not pass the checks, it is considered that the application might not be legitimate, and the method and/or system takes security action (also can be termed "remedial action". This action might comprise: a) preventing launch of/terminating the application/not allowing further execution of the process or application, b) preventing launch of/terminating processes within the application, c) ignore the process, d) reporting to a call back or launch function, and/or e) advisory, warnings, errors etc., among other possibilities. The security actions are configurable.

The present embodiments provide, in general terms, a protection utility 21 that executes on an operating system 20 and system (hardware), where that operating system and/or computer system provide a platform for executing software, such as applications 18, 23. For simplicity, and without loss of generality, this specification will refer to executing/ launching applications to mean the launching or execution of any application, process, service or other software or computer process, or similar. Where it is not possible to detect the execution of a process before launch (e.g. where the process is launched automatically by another process) preventing launch of a process means terminating or taking action shortly after detection of the process and preferably before the process has been able to complete or launch fully. Instead of the term "platform", the general term "computer system" could be used to refer to the hardware and operating system on which the protected environment (a launch environment) is implemented.

The protection utility 21 takes the form of software that provides or creates a protected environment (context) 19 that manages launch of protected applications 23 (that come under its "jurisdiction") to reduce risk of a non-legitimate application launching on the platform and compromising security. The protected environment can also be termed "launch environment" and the terms are used interchangeably, depending on context of what is being described. "Protected environment" indicates the nature of what is achieved, whereas "launch environment" indicates the function by which it is achieved. The protected environment is isolated from the other Windows™ OS contexts/environments to enable controlled launch of applications. The term "application" can used to refer to any application, process, service or other software or computer process). This could be used interchangeably with the term "executable". By protected applications, it is meant any applications that are designated/intended for launch under the protected environment. This is in contrast to standard applications 18 that are launched under the standard operating system/desktop environment 20. Reference to "applications" from here on means reference to "protected applications" unless otherwise stated. It should also be noted that reference to managing launch of applications can be used in general terms to also refer to any management of launch of processes that form part of the application.

To reduce risk of non-legitimate applications launching on the platform, the protected environment 19 conducts a verification procedure (also can be termed "verification process") 35 that checks (verifies) whether an application is legitimate and can be launched. Launch of an application comprises launch of various processes that make up the application. To verify the application, the protected environment verifies the processes 40 of the application as they attempt to launch or are detected. An attempt to launch is detected when the process is detectable by a suitable Windows™ system call, or when a Process ID (PID) is available, typically as or shortly after the process has started. Due to delays in the monitoring system this may not be instantaneous for child processes so the child process may have to be terminated once launched. Therefore verification of an application can be dependent on verification of one or more of the processes 40 of that application. In some cases, the application overall might not be verified per se, but rather just the processes of the application. If the application overall is verified (or processes of the application are verified), the protected environment will facilitate launch of the application (or processes). If the application overall is not verified (or processes of the application are not verified), the protected environment will take security actions to reduce risk that the unverified application (or processes) might compromise security if launched. This action might comprise: a) preventing launch of/terminating the application, b) preventing launch of/terminating processes within the application, c) ignoring the process, d) reporting to a call back or launch function, and/or e) advisory, warnings, errors etc., among other possibilities. The security actions are configurable.

The verification procedure and, where required, resultant security actions reduce the risk of executing non-legitimate applications and/or processes, such as malicious processes that may compromise the security of use of the operating system and the hardware platform. In this specification, an application that passes the verification procedure is deemed (classified as) legitimate, and an application that does not pass the verification procedure is deemed (classified as) non-legitimate. It is possible that an application that does not pass the verification procedure is not malicious, but as a precaution it is deemed so, and appropriate security action is taken.

The protection utility 21 might take the form of/be implemented with an independent software application that can be installed on a computer system and execute on an operating system, or it could be a software module forming part of an overall software application. Other options are possible too. The protection utility can be implemented on a local computer system (e.g. user computer such as a PC), on a network, on a server, as a cloud service, or in any other suitable manner. The application that undergoes verification in the protected environment according to the embodiments herein could be any application that might be executed by user on the platform. The protected environment can be particularly useful for managing launch of applications that are used for interacting/communicating with networks and third parties, such as internet browsers. As an example, the present embodiments could provide a protected environment on a platform where a user is executing software for interacting with remote a server. The protected environment reduces the risk of executing third party malicious code, and/or have communications with a third-party. That said, the protected environment is not restricted to managing launch of only those types of applications. It could manage launch of any applications that are intended only to execute on the operating system including those that operate in isolation, without communication to third parties, such as word processors, spreadsheets, games, utilities, and the like.

One Possible Embodiment

FIGS. 1 and 2 show a typical computer system/network arrangement context 1 in which the protection utility 21 might be used to create a protected environment 19 that manages launch of protected applications. The computer network 1 comprises a user computer 10, which might be part of a local area network 11 and is connectable to a wide area network 12, such as the Internet to access resources, such as those provided by Web servers 13. The user computer 10 also communicates with third-party providers 14 via the wide area network 12 to access services. This might for example be banks, utilities, e-commerce providers or any other service providers that typically provide the services over the Internet.

The user computer 10 has an operating system 20 that enables the user to execute software (such as standard applications) in the usual manner. The user computer is a user/client computer, such as a PC running an operating system 20 such as Windows™ or similar (e.g., Linux, Mac, Android, iOS or thin client), which communicates with the Internet 12, and resources on the Internet 12 and other third parties 14 via the Internet in the usual way. The protection utility 21 that provides protected environment 23 which manages launch of (protected) applications is implemented on the operating system 20 of the user computer 10 in this example. Preferably the protection utility 21 is running in a system account (LocalSystem) 53, or as a system process, to have suitable security privileges to control the protected environment. The user computer has protected applications for execution, which can be launched under the protected environment. The protected environment 19 will, as part of managing launch, verify whether or not the protected applications are legitimate before launching them. The user computer 10 also has standard applications 18 that the user might want to execute. The standard applications that are not launched under the protected environment 19, but rather are launched under the standard desktop environment 20 in the user's normal user account 51. It will be appreciated that while the protection utility 21 in this example is provided on the user computer 10, the protection utility 21/protected environment could additionally or alternatively be implemented on the local network 11, on the cloud as a SAAS (Software as a Service) 15, on a remote server 13, by a third-party service provider 14 or elsewhere. This is shown in dotted lines in FIG. 1.

Figure 2A:
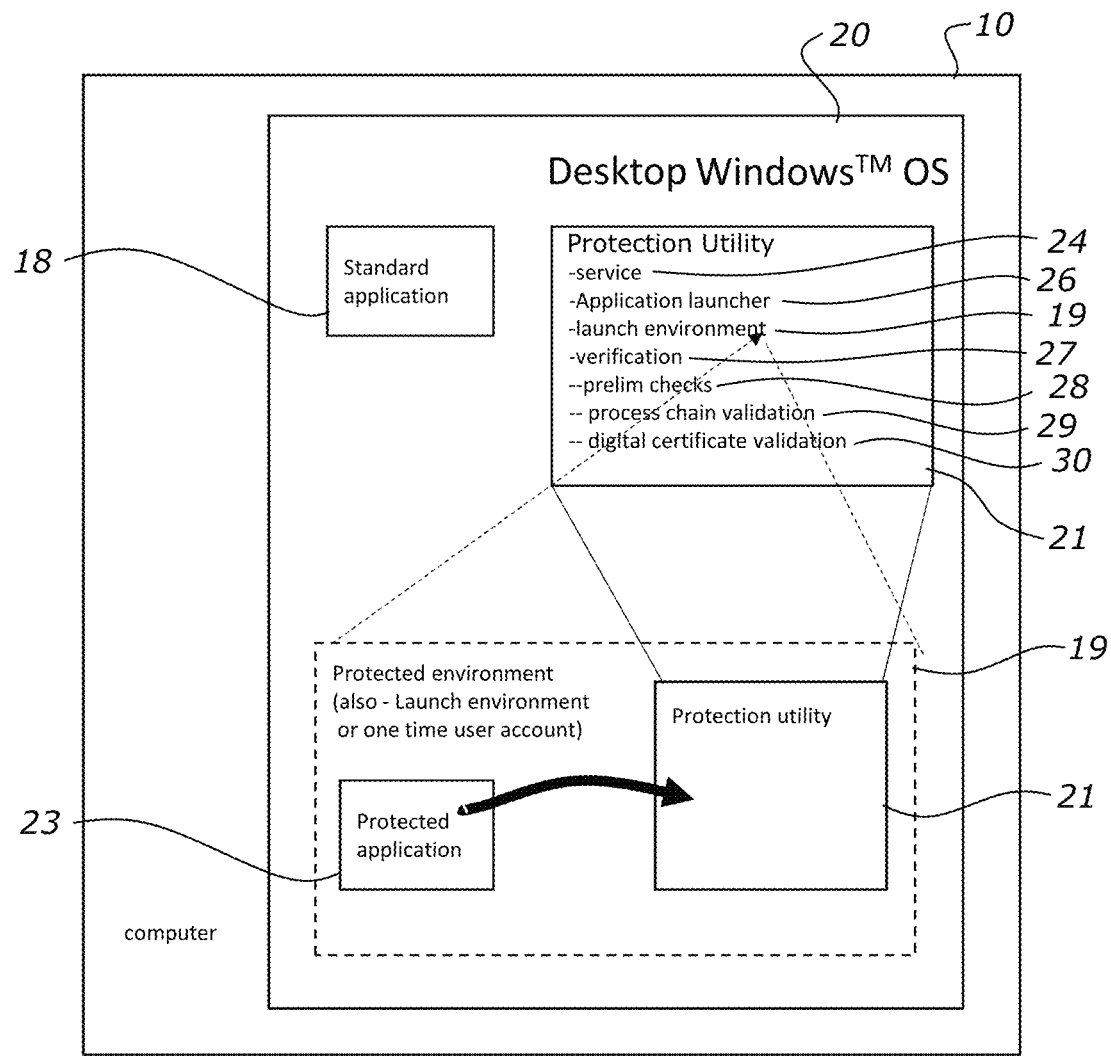
FIG. 2A shows the protection utility and its components on a computer system.
Figure 2B:
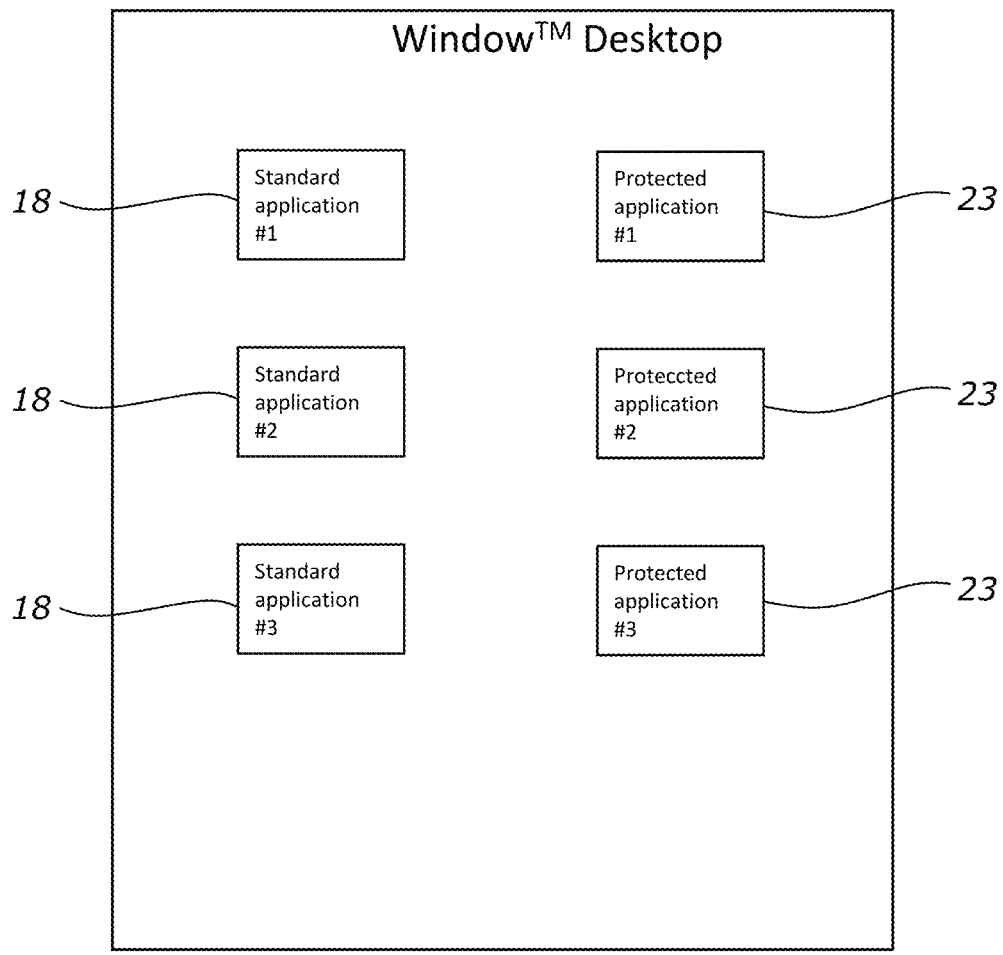
FIG. 2B shows protected and standard applications on a computer screen desktop.

FIGS. 2A and 2B show further detail of the protection utility 21 and the protected environment 19 and its relationship to the user computer 10 and operating system 20. This description can also apply to where the protection utility/protected environment is implemented elsewhere, such as in the cloud 15, on a server 13, network 11, remote computer 14, or the like, and those skilled in the art will appreciate that the description that follows is not restricted to implementation just on a user computer 10.

The protection utility 21 on the user computer that comprises the following modules/functionality. The protection utility 21 is preferably multithreaded to allow the modules/functionality to operate concurrently, in particular so that the new processes can be monitored while processes are launched and any communication between contexts.

Monitoring and verification service ("service") 24—this executes the launch environment, monitors applications to be launched, detects executed processes, carries out verification of an application, and controls launch of an application via the launcher application 26.

Launch environment (also called a "one-time user account" or "protected environment") 19—this is a local Windows™ user account created by the service via the launcher application. It provides a container within which to launch the application 23. The launch environment is isolated from the other Windows™ OS contexts/environments 20 to enable controlled launch of applications.

Launcher application 26—this executes to create the protected environment (launch environment) and is used for starting an application in the launch environment. It may run in a logged-on user context, such as a user's normal Windows™ user account.

Verification process module 27 for implement the verification process (also called "verification procedure") 35 comprising (among other things) the process validation checks (note, not all of these are necessarily implemented, depending on the type of process being launched):

Preliminary checks 28

Process Chain Validation 29—this validates whether a process that is part of the application to be launched is legitimate and should be launched Digital Certificate Validation 30—this checks that the certificate of a process is valid (also called "signature checking").

Figure 3:
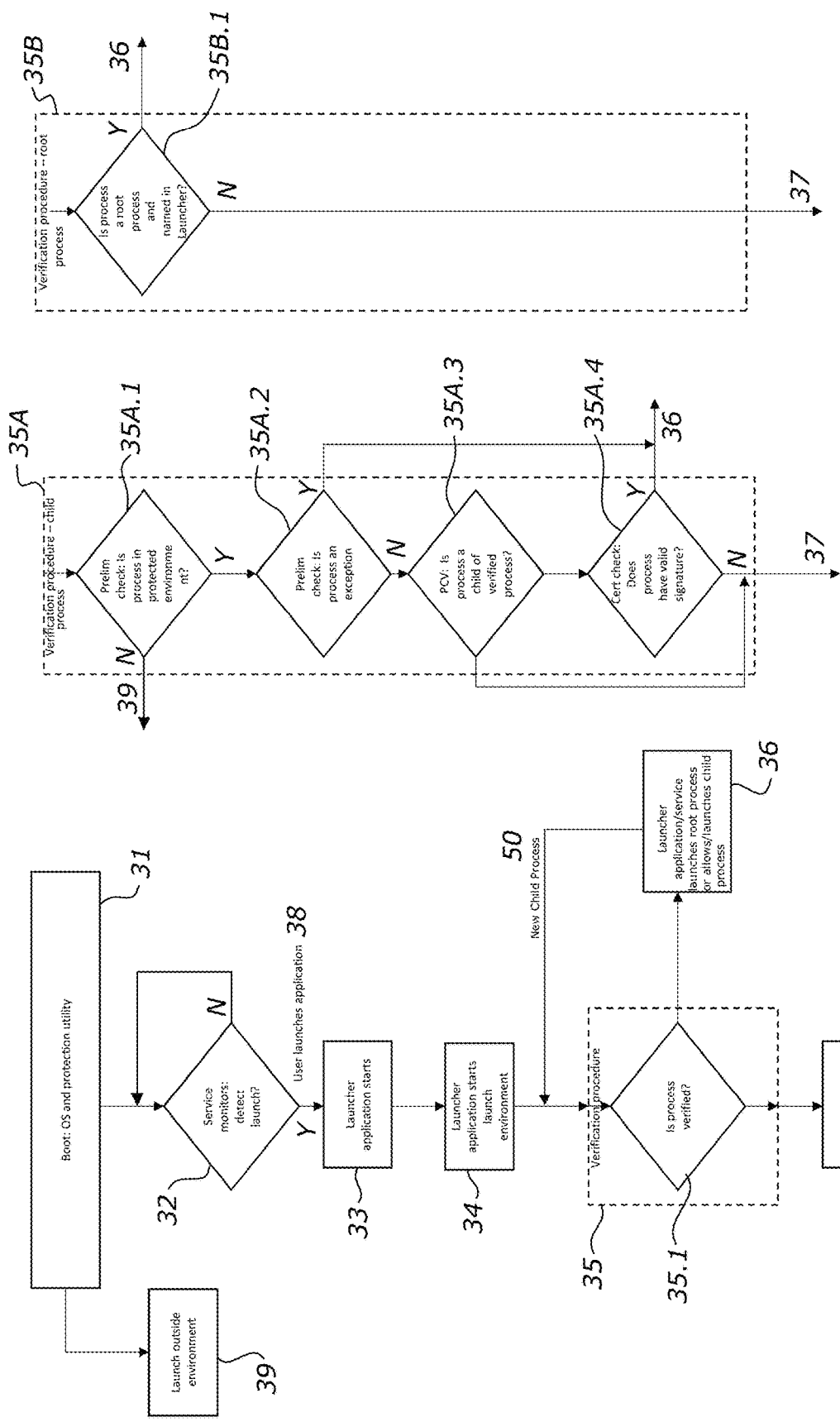
FIG. 3 shows a flow diagram of the verification procedure.
Figure 4:
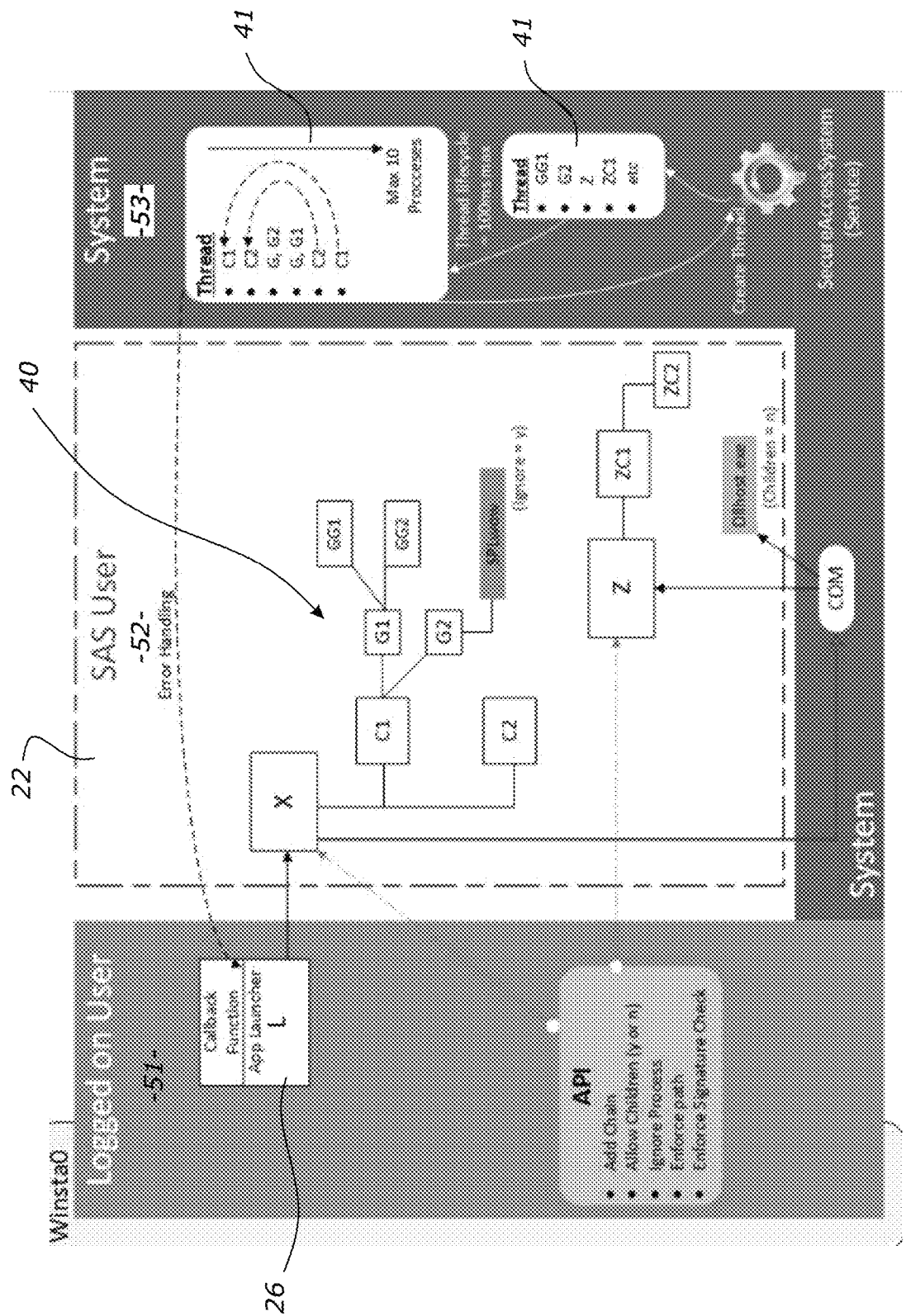
FIG. 4 shows a process diagram of a typical application that undergoes verification.

FIG. 3 shows an overview flow diagram of how the protection utility 21 operates to provide the protected environment. FIG. 4 shows a process diagram of the application attempting to be launched. The user computer 10 operating system 20 upon start-up/boot will execute the protection utility 21, step 31. The protection utility 21 may also be executed manually after boot. When the protection utility is initialised, it will validate its own modules and directories by checking certificates, preferably checking these back to the root certificates. This comprises executing the monitoring and verification service ("service") 24, which monitors for launch of a protected application, step 32. Among other things, the service monitors the launcher application to see if it is attempting to launch a (protected) application in the launch environment. The service will run as a process in the background. It is run as a system user, for instance to provide access privileges to create new user accounts. However, it may also initialise parts, such as the launcher application in the user context. To allow communication between the contexts (system 53, logged-in user 51, and temporary user 52 (protected environment) preferably an encrypted IPC connection with shared memory is used.

When a user attempts to launch a protected application 23 (e.g., by clicking on an icon 23 on the desktop, such as shown in FIG. 2B), step 38, the launcher application starts, step 33. (It is reiterated here that the term "application" can used to refer to any application, process, service or other software or computer process). The icon for the protected application 23 has a special link or shortcut to open the application in the protected environment 19 (as opposed to opening a standard application 18 in the usual Windows desktop environment). The shortcut uses the IPC communication channel to tell the service 24 that a process is to be launched in the protected environment. The launcher application 26 is what controls the ultimate launch of the application (including any processes, services etc), which takes place in the protected environment. The user assumes that the application is legitimate, but of course the protected environment 19 is what verifies whether that is the case or not, and ultimately whether the application 23 can launch.

The service 24 detects the attempted launch of a root process (being the first process of the application, or for the protected environment), step 32, and executes the launcher application which itself launches the protected environment (launch environment) 19 by starting a one-time user account on the Windows™ operating system, step 34. This is a "container" under which all activity takes place when managing launch of the application. The use of the container as a protected environment means that malware, or other malicious code which may be present on the user's account has an additional barrier, particularly because the service checks processes running on the protected environment and the protected environment has a randomized password (which is preferably reset for each instance of protected environment). A temporary or one-time user account 52 is a Windows™ user account generated for the purposes of being a protected environment and preferably without the user being made aware of its use. The security settings of the account may be selected to suit the application.

The service 24 then implements the verification procedure, step 35, in the launch environment 19 to verify the application 23 (or more particularly, the root process of the application—this will be explained later) that the user is attempting to launch (in step 38). The verification procedure 35 implements process validation checks on processes (e.g., X, C2, C1, G2, GG1, GG2, SPLwow, Com, Z, ZC1, ZC2, Dllhost.exe—see FIG. 4) of the application 23 preferably as they are detected. The process validation checks are different for different types of processes. Where the process is a child process (i.e., not the original root process), a child verification procedure 35A is implemented, which comprises the following process validation checks (among other checks). Where the process is a root process, an alternative root verification procedure 35B is undertaken, as detailed later. The child and root verification procedures 35A, 35B preferably comprise some checks in common, where the child has further checks to verify that it is a child of a verified parent function.

The process validation checks 35A for a child process comprise the following.

a) Step 35A.1, 35A.2: Preliminary checks to determine whether the full verification procedure should proceed, or whether the process being checked is either outside the protected environment or an exception and does not need to be verified.
b) Step 35A.3: A process chain validation.
c) Step 35A.4: A digital certificate validation The steps above are performed on each of the processes that are implemented as part of the application. Any of these process validation checks can be carried out in any order and may be carried out concurrently.

The flow chart inset in FIG. 3 shows the process validation checks 35A for a child process in more detail. The application the user is attempting to launch will comprise a root process which will launch various other processes. Each process can spawn one or more child processes (e.g., see FIG. 4) step 50, such that there is a chain (sequence) of, parent, child, grandchild, and subsequent generation processes, all stemming from respective parent processes, and finally with the root process which was the first started in the protected environment. To process validation checks proceed as follows.

Preliminary check #1, step 35A.1: Is the process within the protected environment?
  If no, the process is ignored and does not undergo process validation, step 35A. Rather, the process is launched under the usual operating system desktop environment, step 39. In this case, the process is not verified a such. Rather it is not considered further, and it is not launched by the protected environment.
  If yes, the checks continue as follows.
Preliminary check #2, step 35A.2: Is the process an exception—that is a white list/excluded process?
  If yes, the process can launch or is allowed to continue, step 36. In this case, the application can be deemed verified, even though it has not had to undergo all the checks. In essence, it has been verified "for launch", even though it hasn't been fully checked. For practical reasons, this is allowed to happen.
  If no, the checks continue as follows.
Is the process:
  Step 35A.3: A child process of an already validated process, (this is the process validation check?
    If no, the process is not verified, and cannot launch. Security action is taken, step 37.
    If yes, the checks continue as follows.
  Step 35A.4: A process with a valid digital certificate (this is the digital certificate validation check)?
    If no, the process is not verified, and cannot launch. Security action is taken, step 37.
    If yes, the service will instruct the application launcher to launch or allow the process, step 36.

The checks above can happen in any suitable order, or concurrently in different threads. For example, the last two checks are the process chain validation and digital certificate validation respectively. These can be carried out in any order. If both checks are valid (that is the process is a child process of an already validated process and has a valid digital certificate), then the process can launch. Also, in some configurations, without limitation, it might be considered that the preliminary check #1, step 35A.1 (to see if the process is attempting launch in the protected environment) does not form part of the verification procedure per se. Rather, it is a preliminary check to determine whether the verification procedure proper starts. The verification procedure need not necessarily have all the checks described above and/or some of the checks might fall outside of the verification procedure. Therefore, the term verification procedure should not be considered limiting to that and only that set of checks set out above.

The above is the verification procedure 35A for a child process. In the case of a root process, for instance the first process opened as part of an application, (e.g., X FIG. 4) a different verification procedure, step 35B, is undertaken, this is because the root process is not a child of any process.

The process validation checks 35B for a root process comprise the following. This is different because there is no parent process to verify with, and the control of the launch of the root process is with the launcher application. Whereas child processes are launched directly by their parent processes without the direct control of the application launcher, so to prevent (full) launch they must be terminated or disallowed quickly. This uses on-going monitoring of processes across the system, SAS (protected environment) 52 and logged in user environment to identify new processes.

There is a check whether the signature is of a particular vendor (e.g., Microsoft™), matching the expected vendor, step 35B.1. If so, the root process is launched via the launcher application 26 (by the service 24) and has its signature verified prior to launching. This becomes the root process for the chain.

More particularly, the launcher application is configured to contain the name of the root process and the name of the subject of the digital signature of the root process. When the services receives a launch command from the launcher application 26, it conducts digital signature validation (checks signature has a certificate chain and trusted root are valid, for instance using Windows™ crypto functions or other API calls). This confirms that the root process has not only a valid certificate on the process, but that this certificate is correctly linked to a root certificate from a trusted partner (which are stored within Windows™ system. It verifies that the vendor subject name matches the application name. This is to prevent a malicious actor creating an application with the same name as the launcher process and signing it with a valid certificate, thus trying to launch a malicious app within the protected environment.

As each of these processes (root or child processes) are launched or attempt to launch, the verification procedure 35 will attempt to verify these processes in the verification procedure (appropriate to the type of process) using the series of checks ("process validation checks"), including in the case of a child process 25A, the process chain validation and digital certificate validation steps 35A.3, 35A.4. If a process is not verified (that is, process validation checks are not satisfied for a particular process), it could be a non-legitimate process, that if implemented could risk security of the user computer. In this case, the service prevents the launcher from launching the application (or a process of the application), step 37, or takes other security action such as terminating a process. This action might comprise: a) preventing launch of the application, b) preventing launch of processes within the application, and/or c) reporting to a call back or launch function, among other possibilities. The security action may be performed directly by the protection utility 21, for instance by direct termination of a process from the system context. Alternatively, through a call-back function, using the IPC channel, or otherwise the protection utility 21 may send a message to the user, or cause the program to crash, or halt either just the non-legitimate process or all processes associated with the root of the non-legitimate process. Preferably the process is terminated directly by the protection utility 21 to stop it as quickly as possible.

As an example, consider a word processor application being launched. One child process from Word processor could be for support for example. A malicious actor could replace just that process in a manner in which a legitimate word processor launches, and it could trigger the launch of a malicious support. The embodiments described detect this and would not run the malicious support process, and terminate it (even, if for example the rest of the word process application and its other processes are executed). If the process is verified, step 35.1 (that is, process validation checks are satisfied for a particular process), then the service 24 allows the application launcher 26 to launch the application 23 (or that particular process of the application) in the launch environment, step 36. By preventing execution of an un-verified process/application, or taking other security action, the protected environment reduces the risk of executing malicious processes on the client computer that might compromise security. For child applications, which are detectable only after the process has started (e.g., been assigned a PID), the protected environment allows these to be terminated or security action to be taken against them as soon as possible, preferably during launch.

There are also other types of processes (other than root or child processes) that undergo a different verification procedure, which will be described in the illustrative example.

Illustrative Example

Details of one example the process will now be described below with reference to the embodiment above.

Referring to FIG. 4, The protection utility 21/protected environment 19 manages launch of protected applications. Any process that forms part of the protected application to be launched, will undergo the verification procedure 35 (comprising various process validation checks) to determine whether the protected environment will permit the process and application to execute. In short, if the process attempting to be launched under the protected environment satisfies the process validation checks, step 35, then it can be executed in the environment, step 36. If the process does not satisfy the process validation checks, it will not be executed or will be terminated, and the application not launched, step 37. If an unprotected application (standard application e.g., 18) is attempting to launch outside of the protected environment 19, the protected environment will ignore it and the unprotected application will be launched in the standard Windows user environment as per usual, step 39,—of course subject to the usual security risks.

With reference to FIGS. 3 and 4 the protected environment operation with be described in more detail with respect to an application that is attempting to launch. The protected environment will first be described from the perspective of a user experience, trying to launch a legitimate application. However, in practice the user computer and protected environment will run in an agnostic fashion and will have no knowledge of what is being launched and by whom. It will simply run through the checks in an objective manner. Of course, a particular application might not pass verification, in which case it will not launch.

The verification procedure step 35 carries out the following process validation checks on any process (generally labelled 40) that attempts to launch as result of the attempted launch of the application. The first described verification procedure is the special case root verification procedure step 35B that is carried out on a root process X. This differs to the child verification procedure 35A for the general case of child processes, which will be described separately.

The user computer 10 has installed and is executing the protection utility 21 for the protected environment, step 31, as described above. Referring to the diagrammatic desktop in FIG. 2B, which shows a protected application e.g. #1 23 that the user wants to launch—in this case a word processor, the user clicks on the desktop icon of the protected application 23. It will have a link that initiates launch under the protected environment 19, rather than the usual desktop environment 20. If it is to be launched in the protected environment 19, a default one-time user account (SAS) is created comprising a profile which runs in medium integrity mode and is removed when Windows™ shuts down. The one-time user account 52 is separated from both the system account 53 running the protection utility and the logged-in user account 51. This means that any malware on the logged-in user account is unable to see or access processes in the one-time user account because it does not know the randomly generated password (generated each time the one-time user account is created). As part of the process of creating the one-time user account the protection utility 21 also creates a communication channel to allow communication between the environments. The communication channel is preferably an encrypted IPC (Inter Process Communication) connection which uses a shared area of memory to allow the communication. The service monitors 24 processes that are started in the SAS user context, and ensures they are started in the correct context (by the Launcher), this comprises sub processes and others which may be called via system calls.

The user assumes the application 23 is legitimate. However, that may or may not actually be the case, and the application overall and/or processes that might be launched as part of the application could pose a security risk. These processes are part components of executables, DLLs etc. As an example, consider a word processor application being launched. One child process from Word processor could be for support for example. A malicious actor could replace just that process in a manner in which a legitimate word processor launches, and it could trigger the launch of a malicious support. The embodiments described detect this and would not run the malicious support process, and terminate it (even, if for example the rest of the word process application and its other processes are executed). Therefore, it is the purpose of the protected environment to implement verification to determine whether or not the process/application can actually be launched.

The launcher application first attempts to launch a root (top-level parent) process X. The application is launched by the application launcher 26 which creates a root certificate chain. The root process X spawns one or more child processes, and those child processes themselves might spawn one more child processes, down through multiple generations. This creates a process chain 40, for example seen in FIG. 4. In the context of this description, any particular process can be deemed to be a parent, child or grandchild process depending on context and its relative relationship to other processes. For example, while GG1 is a great grandchild process of process X, it is a child process of process G1. G1 is a child process of C1, but a parent process of GG1. Further, any particular process can have one or more parent processes in one or more previous generations, and any such process can have one or more child processes, grandchild processes, or subsequent generation processes (e.g. great grandchild processes). For example, a particular process might spawn more than one child process of the same generation, and each of those child processes, might spawn one or more child processes of their own, which become grandchild processes of the initial process. In FIG. 4, the following processes are spawned from X: C2, G1, G2, GG1, GG2, SPLwow, Com, Z, ZC1, ZC2, Dllhost.exe.

Referring to FIGS. 3 and 4, the verification procedure is undertaken on each of the processes as they attempt to launch. The root process undergoes a different verification procedure 35B, as it is not a child process so cannot be validated by being a child of an earlier application. Root process X is the first process to be run in the protected environment, created by the launcher and has its signature validated prior to launch.

Starting with the root process X, the service detects the attempted launch, step 32, and then checks to see if the application should be launched in the protected environment (launch environment) 19. If it is not, the process is ignored—it is not within the "jurisdiction" of the validation process, and it makes no determination or has no control over such process. It is assumed that if someone is launching an application outside the protected environment, step 39, and it is their decision to take that risk.

If it is inside the protected environment, the verification procedure 35B continues. The Windows™ OS provides a function to validate a root certificate, because the OS ships with several trusted root certificates included. For example, various crypto APIs are provided by Windows, or the openssl library. The launcher application 26 of the present embodiment is configured to contain the name of the root process X and the name of the subject of the digital signature of the root process.

When the services receives a launch command from the launcher:
- It conducts digital signature validation (checks signature has a certificate chain and trusted root are valid)
- It verifies that the vendor subject name matches the application name. This is to prevent a malicious actor creating an app with the same name as the launcher process and signing it with a valid certificate, thus trying to launch a malicious app within the protected environment.

If the verification does not pass, the process is terminated (or not launched in the first place) step 36; and the application will not launch.

Once the root process X verification procedure 35B has taken place, and the root process is launched, step 36, the root process X then spawns child processes C1, C2. Taking C1 as an example, this is a child process (and not a root process). Therefore, the second general case child verification procedure 35A is commenced. The service 24 will first detect the attempt to launch the process, step 32, and then will implement the child process verification procedure, step 35A. The detection of the process 32 by using an operating system call to detect processes, preferably all processes active in the in operating system which is then filtered to find processes in the protected environment. The processes are preferably scanned regularly, preferably with a sampling interval, for instance every 100 ms. For example, new processes can be determined by comparison to the earlier list of known processes. As noted above, the verification procedure comprises preliminary checks, steps 35A.1, 35A.2, process chain validation, step 35A.3, and a digital certificate validation check, step 35A.4.

As part of the preliminary checks, the service 24 determines if the process C1 is attempting to launch in the protected environment/launch environment, step 35A.1. The process detection reviews the Process ID (PID) to determine that the process is operating in the protected environment. If the process is not attempting to launch in the protected/launch environment, the process is ignored by the protected environment as the process is outside the "jurisdiction" of the protected environment and will simply execute in the normal way, step 39.

Assuming that the process C1 is attempting to launch within the protected/launch environment, the service then determines if the process is an exception, step 35A.2. If it is an exception process, it will be launched, step 36, without undergoing the full verification procedure (e.g. no verification procedure, or a limited verification procedure), but may have other limitations, like not being permitted to launch child processes. (If the process X is not an exception process, then it will not have these restrictions (assuming it is verified), and for example can spawn a child process.)

There are 3 types of exception processes, as follows.

- Excluded processes—a process that should be ignored/allowed to execute without a signature. In Windows™ applications, some processes are not signed, and therefore cannot be verified under the verification procedure. Without limitation, these might comprise printing processes, DLL host process, or any other processes, as configurable via an API, for example. Excluded processes are required as some applications launch child processes which are unsigned by the vendor (including Microsoft™), thus the ability to exclude these from the verification procedure. These can spawn child processes, but those child processes will undergo a verification procedure.
- White list processes (child unrestricted)—these run outside the chain validation process, but they do undergo digital certificate signature validation. They can spawn child processes, but those child processes will undergo the verification procedure. An example is SPL-WOW.exe, which handles printing.
- White list processes (child restricted)—these run outside the chain validation process, but they do undergo digital certificate signature validation. They cannot spawn child processes. An example is DLLHost.exe, which is used by the operating system.

The exception process and any limitations or features of these may be stored in the shared memory of the encrypted IPC connection. In higher security situations the white-list exception processes may be reduced, for instance requiring that all processes have a valid signature.

If an excluded process or a whitelist process is detected, the service will enable the launcher application to launch the process, step 36, albeit with restrictions on child processes as described above. If the service determines that the process is not on an exception, then the remaining process validation checks of the verification procedure are implemented, steps 35A.3, 35A.4.

Assuming the preliminary checks are satisfied, then the service continues with the verification procedure is to conduct process chain validation on the process. This will be briefly described in relation to one child process e.g. C1.

In process chain validation, the service checks if the process attempting to launch is a child process of an already verified process, step 35A.3. If it is, then the process can launch, step 36. If the process being verified is not a child process of an already verified process, then it will not be launched, or if already launched then it is terminated, and/or the system reports to a call back function and/or another security action is taken such as those previously mentioned, step 37. The process may be terminated directly by the protection utility 21 or through interaction with the parent process. The service can find the parent process of a using Windows™ APIs or otherwise, it is then possible to verify that the parent process has already been checked.

The above description of the process chain validation assumes all root, parent, child and grandchild processes are detected by the service in chronological order. However, this is not always the case. When validating the processes above, a child process might not be detected by the service 24 before its parent is detected and verified by the service. This is because root, parent, child, and grandchild processes are not always detected by the service in chronological order, for instance the processes start faster than the new process detection interval (i.e., PID sampling interval). For example, this might happen when e.g. grandchild process G1 is detected before child process C1. In this case, G1 is actually a child process of C1, and C1 is the parent process of G1. The child process cannot be verified because it will not yet be deemed to be a child process of an already validated process by the service.

To address this possibility, when checking if a child process e.g. C1 has a verified parent process, a threading process 41 is implemented. As part of the process chain validation, the service creates a thread to handle parent/child/grandchild processes that may be detected/reported out of chronological sequence (that is, out of order). The thread is created to temporarily track and hold parent, child e.g. G1, grandchild e.g. GG1 and subsequent generation processes, that are detected out of order. For simplicity, the present specification will simply refer to parent, child and grandchild processes. So in this example, when the child process G1 is detected, but no parent process C1 is detected, the child process G1 is placed in the thread. At some stage later, when the parent process C1 is detected, it is also placed in the thread and re-sorted so it appears as a parent to the child process G1. The parent process C1 can be validated in the usual way, and then once it is validated (assuming it is) the child process. G1 can be validated by virtue of being a child process of an already validated process (assuming also passes the signature checking). The threading process may be considered to be a list or queue of processes to be checked. As processes are checked they are removed from the list. Where a child process is added to the list before its parent process the child process is left on the list until its parent process is identified (because the parent process is required to complete verification). Once the parent process is identified the child process can be verified and removed from the list/queue if verification is successful or handled by a security action.

The thread functions to order the processes correctly according to parent, child and grandchild generations, so that they are in the correct sequence and generations. Once such processes are properly sequenced (for example, in this case C1, G2, GG2 etc.), the process chain validation can take place, as described above. If a process chain is validated by the service using process chain validation, the next step in the verification procedure of the process can take place. If not, error conditions may be generated to the Callback function (1d), and/or one of the other security actions can be taken as previously mentioned or action may be taken directly, e.g. termination of an process.

The thread lifecycle is valid for 100 ms which enough time is to allow the validation & sorting process to occur.

To prevent situations where a blocked process continually tries to start the thread allows a maximum of 10 processes to exist and if exceeded will report to the Call back function (1d) which will determine relevant action.

A callback function to handle validation errors is provided to the App launcher (1) via the service. This handles errors generated from process validation thread (1c)

Returning back to the verification procedure 25A, if the process C1 attempting to launch is determined to be a child process of an already verified process (in this case, it is—C1 is a child process of verified process X), step 35A.2; then the next step of the verification procedure is for the service 24 to check if the digital certificate (signature) of the process is valid, step 35A.4. The digital certificate with which a process is signed with is checked by checking the vendor name, the certificate chain and the trusted root certificate are all validated. Windows™ includes crypto APIs to check digital certificates.

In one example, a signature function can be used that validates the following for executables and DLLs.
    a. Application vendor matches (this is optional, because sometimes application also package third-party code which is not always signed, thus it is not appropriate to undertake this check)
    b. Certificate Hash
    c. Validate each certificate in the chain
    d. Trusted root is a valid CA against the Microsoft store
    e. Validate the certificate date stamp is valid (this is optional as some benders do not sign their files for more than 3 months, which is impractical)

If the digital certificate satisfies all the checks above, (it is assumed that C1 does in this example) then the digital certificate is valid, and the process is verified and can be launched, step 36.

Of course, as noted earlier, the preliminary, chain validation process, and digital certificate validation do not have to happen in the order above. Irrespective of the order they are carried out and, once the checks are satisfied, the verification of the process is complete. If verified, the process can launch, step 36. If not, one of the security actions are taken: a) preventing launch of/terminating the application, b) preventing launch of/terminating processes within the application, c) ignore the process, d) reporting to a call back or launch function, and/or e) advisory, warnings, errors etc., among other possibilities, step 37.

At that point, one child process—in this case C1—has been verified. The same child process verification procedure is carried out on all the remaining child, grandchild and subsequent generation processes in the same manner (in addition to process C2 that spawned from root process X). Process C1 spawns two further child processes, G1, G2 (themselves grandchild processes of X) and they can be verified using the verification procedure in the same manner and launched, or allowed to continue executing. Process G1, then spawns further child processes GG1, GG2 (themselves grandchild processes of C1, and great grandchild processes of X). They undergo the same checks and are launched or allowed to continue executing. In this time, X can be considered the parent, C1, C2 is child processes, G1, G2 is grandchild processes, and GG1, GG2 are great grandchild processes. Process C2, G1, G2, GG1, GG2, Z, ZC1, ZC2 are similar to C1 in terms of the manner in which they undergo and satisfy the verification procedure. They are all child processes that are attempting to launch in the protected environment, are not exceptions, are child processes of already verified processes, and they have valid digital certificates. For that reason, they are verified in the same manner as C1, as follows.

The service 24 checks if the process is being launched within the protection environment, and therefore needs to be verified, step 35A.1 by monitoring for new processes in the protected environment. The service then checks if the process is an exception (white list/exclusion process), step 35A.2. If both these checks are satisfied, then the process is in the "jurisdiction" of the protection environment, and is not excepted from verification, then it needs to be verified before it can launch, or terminated if it has launched.

The service 24 checks if the process is a child process of an already validated process, step 35A.3. In this case it is, as a child process of a verified process, which was verified previously. The digital certificate check is then conducted—in this case, the signature is valid, step 35A.4. Therefore, the process has satisfied all the process validation checks, and is therefore verified by the verification procedure. The process is cleared for launch. The application launcher 26 instructs the service 24 to launch the (protected) process, step 36, or if the process has already launched takes no steps to stop or limit the process. The same checks occur for child process C2, which also passes the process validation checks and is verified and can launch.

Some of the processes 40 are different and they trigger a different outcome from the verification procedure 35A. Such processes might be, for example: SPLwow, COM, Dllhost.exe. The same verification procedure is undertaken step 35A, but the outcome is different. Some of these will be explained below.

SPLwow is a Windows™ printing process that is a child process of G2. It is unsigned (does not have a digital certificate). It is attempting to launch in the protected environment so does come under the jurisdiction of the protected environment and is subject to the verification procedure 35A, but because it is unsigned it is deemed an excluded process under the preliminary check looking for exceptions, step 35A.2. The service will allow the launcher application to launch the SPLwow process (using the "ignore process" flag) without it undergoing the process chain validation check, step 35A.3, and the digital certificate check, step 35A.4. It would be allowed to launch a child process, but that child process will undergo the verification procedure in the same way.

Referring to FIG. 4, the application launcher 26 can also launch other processes from operating system calls such as COM. COM is another process that generates a different outcome from the verification procedure, 35A. COM is a child process of X and is part of Microsoft's component object model which is part of the Windows OS, thus cannot be included in the protected environment. It attempts to launch outside the protected environment. As such, in the service detects launch of COM, simply ignores it as under the preliminary check of the verification procedure, the service determines that it is not in the protected environment. COM spawns child process Z, and subsequent generation processes ZC1, ZC2 which are verified as described earlier. The operating system decides automatically where processes will launch. For example, this is why the COM function, part of Windows, will launch in the system environment rather than the protected environment. Typically, or by default, child functions will launch in the same context or environment as their parent—meaning that most processes launched by processes in the protected environment will remain in the protected environment. In some cases, processes may be required to run inside a protected environment—so that a user is unable to run them except when a protected environment is used.

Some applications launch additional process with the help of the Windows OS (COM). Here, COM also spawns child process Dllhost.exe DLLHost.exe is a process called from COM (3), as this is a widely used system function is started outside of the chain. These processes are not child processes of the launched application and are manually dealt with by the program.

The service set to allow this to run but will ensure that:
1. Signature checking is enforced for this executable
2. It runs from the correct path
3. No child processes can be started As shown in the examples above, all the processes were actually legitimate and pass the validation checks, so were verified and launched. However, a non-legitimate (e.g. malicious) process would not pass the checks, and therefore would not be launched. Or, even a process that is not malicious but does not pass the checks will not be launched. This is because it cannot be verified, and therefore cannot be known if this is a malicious process or not, so the service 24 will not launch the process in the protection (launch) environment.

For example,
  a (potentially malicious, but unknown) process might be launched in the protected environment. Because this is attempting to launch in the protected environment, it must pass the verification procedure before it can be launched. However, the process is not a white list/ excluded process, and it is not a child of any verified parent process. Therefore, it will not be executed or will be terminated and/or other remedial action may be taken.
  Likewise, a (potentially malicious, but unknown) process might be launched in the protected environment as a child process of Z. While this does satisfy the requirement of being a child process of a validated process, it signature checking does not pass. Therefore, the process will not be allowed to continue to execute, or complete launch.

In summary and without limitation, the embodiments provide a protected environment and validation process— used in conjunction with each other. A new user environment (protected environment) is created on a Windows™ operating system in order to provide an isolated and protected environment for the protected application to run in. There is restriction on the applications that can execute within this environment so as to exclude any malicious application. This is done by validating the processes which are enabled to run in the protected environment. This process validation comprises two elements working in conjunction: (a) Signature checking and (b) Process chain validation. The procedure we follow is: If the process is started in a valid (already verified) chain of processes, then the signature is checked, and if ok then the process is allowed. If the process is not started in the chain, then the process is not allowed to run in the protected environment.

The invention claimed is:
1. A method for executing a process on a Windows™ operating system comprising:
  monitoring processes in a protected environment,
  detecting a new process in the protected environment, and
  checking that the process is legitimate and can be verified by carrying out process validation checks comprising, in any order, determining if the process:
    is a child process of a previously verified process in the protected environment, and
    has a valid digital certificate, and executing the process if the validation process checks are satisfied, or taking remedial action if the validation process checks are not satisfied, wherein the monitoring of processsses and the validation checks are operated by a utility running in a Windows™ System account and the protected environment is a temporary Windows™ user account.

2. The method according to claim 1 wherein the step of monitoring processes in a protected environment comprises scanning for new processes on the operating system and identifying processes in the protected environment.

3. The method according to claim 1 wherein the step of determining if the process is the child process of the previously verified process in the protected environment comprises calling a Windows™ operating system function.

4. The method according to claim 1 wherein the process validation checks further comprising a preliminary check to determine if the process is an exception.

5. The method according to claim 4 wherein the preliminary check to determine if the process is the exception, comprises one or more of the following checks:
   if the process is an excluded process, omitting determining if the process has a valid certificate,
   if the process is a child of an unrestricted white-list process, omitting determining if the process is the child process of a previously verified process,
   if the process is a child of a restricted white-list process, omitting determining if the process is the child process of a previously verified process, but prevent the process spawning a child process.

6. The method according to claim 1 comprising creating a process thread to handle a process detected out of sequence with its parent process.

7. The A method according to claim 6 comprising a limit on the number of processes which can be held in the process thread.

8. The method according to claim 1 wherein the step of determining if the process has the valid digital certificate comprises running the Windows™ operating system or openssl Crypto API on each of one of more digital certificates in a digital certificate chain.

9. The A method according to claim 1 wherein remedial action comprises one or more of:
   a) terminating the application related to the process,
   b) terminating the process,
   c) ignore the process,
   d) reporting to a call back or launch function, and/or
   e) providing advisory, warnings, errors.

10. The method according to claim 1 wherein the steps of the method are repeated for a plurality of subsequent detected processes.

11. A method for executing a plurality of processes on a Windows™ operating system comprising:
   receiving an instruction to execute a process in a protected environment and, with a utility for managing launch of processes in protected environments:
   verifying the process by checking the process has a valid digital certificate,
   creating the protected environment, comprising creating a temporary user account with a random password, and launching the process in the protected environment,
   wherein upon launch of the process in the protected environment the method comprises, with the utility for managing launch of processes in protected environments:
   detecting one or more further processes in the protected environment,
   checking that each of the one or more further processes are legitimate and can be verified by carrying out process validation checks comprising, in any order, determining if each of the one or more further processes:
      is a child process of a previously verified process, and has a valid digital certificate, and,
   executing each of the one or more further process if the validation process checks are satisfied, or taking remedial action if the validation process checks are not satisfied.

12. The method according to claim 11 wherein the utility operates in the system environment of the Windows™ operating system.

13. The method according to claim 11 wherein the instruction to execute the process in the protected environment is received from a user in a Windows™ user account.

14. The method according to claim 11 wherein the step of creating the protected environment comprises the step of creating an IPC communication channel with shared memory between the utility and the protected environment.

15. The A method according to claim 11 wherein the step of detecting one or more further processes in the protected environment, comprises the steps of:
   checking for processes running on the windows operating system,
   identifying new processes, and
   identifying which of the new processes are associated with the protected environment.

16. The method according to claim 11 wherein the step of determining if the one or more further processes has the valid digital certificate comprises running a Windows™ operating system or openssl Crypto API on each of one of more digital certificates in a digital certificate chain.

17. A computer system configured executing a process on a Windows™ operating system comprising:
   a Windows™ operating system,
   a utility for managing launch of processes, the utility comprising:
      a service to detect launch of the process,
      an application launcher, and
      a verification process module to carry out the process validation checks, and
   a processor configured for executing the operating system and utility,
   wherein upon receiving an instruction to execute thea process with the utility the processor is configured to:
   check the process has a valid digital certificate,
   create a protected environment,
   launch the process in the protected environment, and
   wherein upon launch of the process in the protected environment the processor is configured to:
   detect further processes in the protected environment,
   check that the further processes are legitimate and can be verified by carrying out process validation checks comprising, in any order, determining if each of the further processes:
      is a child process of a previously verified process, and
      has the valid digital certificate,
   and,
   executing the further process if the validation process checks are satisfied, or take remedial action if the validation process checks are not satisfied.

18. The computer system according to claim 17 wherein the utility operates in a Windows™ system account, the protected environment is a temporary Windows™ user account and the instruction is received from a further Windows™ user account.

19. The computer system according to claim 17 wherein the step of determining if each of the further processes has the valid digital certificate comprises running a Windows™ operating system or openssl Crypto API on each of one of more digital certificates in a digital certificate chain.

\* \* \* \* \*